(12) United States Patent
Appelman et al.

(10) Patent No.: US 11,519,737 B2
(45) Date of Patent: Dec. 6, 2022

(54) PATH PLANNING WITHIN A TRAVERSED AREA

(71) Applicant: ELTA SYSTEMS LTD., Ashdod (IL)

(72) Inventors: Dina Appelman, Bat-Yam (IL); Ofir Cohen, Tzelafon (IL); Roman Bronstein, Ashdod (IL)

(73) Assignee: ELTA SYSTEMS LTD., Ashdod (IL)

( * ) Notice: Subject to any disclaimer, the term of this patent is extended or adjusted under 35 U.S.C. 154(b) by 145 days.

(21) Appl. No.: 16/631,244

(22) PCT Filed: Jul. 31, 2018

(86) PCT No.: PCT/IL2018/050852
§ 371 (c)(1),
(2) Date: Jan. 15, 2020

(87) PCT Pub. No.: WO2019/026074
PCT Pub. Date: Feb. 7, 2019

(65) Prior Publication Data
US 2020/0208993 A1    Jul. 2, 2020

(30) Foreign Application Priority Data

Jul. 31, 2017  (IL) .......................................... 253769

(51) Int. Cl.
*G01C 21/30* (2006.01)
*B62D 15/02* (2006.01)
*G05D 1/00* (2006.01)

(52) U.S. Cl.
CPC ......... *G01C 21/30* (2013.01); *B62D 15/0265* (2013.01); *G05D 1/0088* (2013.01)

(58) Field of Classification Search
CPC ...... G01C 21/30; G01C 21/203; G01C 21/32; B62D 15/0265; G05D 1/0088;
(Continued)

(56) References Cited

U.S. PATENT DOCUMENTS 8,060,306 B2 * 11/2011 Puhalla ............... B60W 40/072
701/93
9,097,549 B1    8/2015 Rao et al.
(Continued)

FOREIGN PATENT DOCUMENTS

CN    103335658 B    9/2016
CN    105675002 B    3/2018
(Continued)

OTHER PUBLICATIONS

Allen, Thomas et al., "Dynamic Path Planning With Multi-Agent Data Fusion—The Paralllel Hierarchical Replanner", IEEE International Conference on Robotics and Automation, 2009, pp. 3245-3250.
(Continued)

*Primary Examiner* — Alexander G Kalinowski
*Assistant Examiner* — Sanjeev Malhotra
(74) *Attorney, Agent, or Firm* — Dorsey & Whitney LLP

(57) ABSTRACT

The disclosure relates to real-time autonomous path planning for a vehicle, and to the steering of the vehicle in accordance with the path. The path is planned in accordance with a given map of the area, and the path accuracy depends, inter alia, on the resolution and accuracy of the map.

23 Claims, 8 Drawing Sheets

(58) Field of Classification Search
CPC .... G05D 1/0274; B60W 30/00; B60W 50/14; G06F 30/15
USPC ...... 701/2, 3, 19, 23, 27, 41, 115, 301, 538; 356/614; 463/6
See application file for complete search history.

(56) References Cited

U.S. PATENT DOCUMENTS

| | | | |
|---|---|---|---|
| 9,457,807 B2 | 10/2016 | Lee et al. | |
| 2003/0109296 A1* | 6/2003 | Leach | G06T 11/203 463/6 |
| 2006/0058931 A1* | 3/2006 | Ariyur | G08G 5/0078 701/23 |
| 2008/0082250 A1* | 4/2008 | Husted | F02D 41/28 701/115 |
| 2012/0010772 A1* | 1/2012 | Pack | G05D 1/0088 701/27 |
| 2012/0095619 A1* | 4/2012 | Pack | G05D 1/0274 701/2 |
| 2013/0013190 A1 | 1/2013 | Hayot et al. | |
| 2013/0131908 A1* | 5/2013 | Trepagnier | B60W 10/20 701/1 |
| 2013/0132369 A1 | 5/2013 | Delling et al. | |
| 2013/0261856 A1* | 10/2013 | Sharma | B61L 25/026 701/19 |
| 2015/0149088 A1* | 5/2015 | Attard | B60W 30/08 701/538 |
| 2015/0292894 A1 | 10/2015 | Goddard et al. | |
| 2015/0353082 A1* | 12/2015 | Lee | B60W 10/20 701/41 |
| 2016/0070265 A1* | 3/2016 | Liu | G01C 21/00 701/25 |
| 2016/0169659 A1* | 6/2016 | Steffey | G01S 7/4817 356/614 |
| 2016/0209849 A1* | 7/2016 | Arbogast | G05D 1/0291 |
| 2016/0299507 A1* | 10/2016 | Shah | G01C 21/203 |
| 2016/0313133 A1* | 10/2016 | Zeng | B60W 30/0956 |
| 2017/0091350 A1* | 3/2017 | Bauer | G06F 30/15 |
| 2017/0277195 A1* | 9/2017 | Frazzoli | B60W 60/0015 |
| 2018/0173242 A1* | 6/2018 | Lalonde | G05D 1/0214 |
| 2018/0244278 A1* | 8/2018 | Shami | G05D 1/0088 |
| 2018/0292826 A1* | 10/2018 | DeFelice | G05D 1/0094 |
| 2019/0120939 A1* | 4/2019 | O'Keeffe | G01S 7/4817 |
| 2019/0137287 A1* | 5/2019 | Pazhayampallil | G05D 1/0291 |
| 2019/0179304 A1* | 6/2019 | Iagnemma | G05D 1/0088 |
| 2019/0212450 A1* | 7/2019 | Steinberg | G02B 26/10 |
| 2019/0258260 A1* | 8/2019 | Sunil Kumar | G01C 21/30 |
| 2019/0265705 A1* | 8/2019 | Zhang | B64C 39/024 |
| 2020/0033155 A1* | 1/2020 | Appelman | G06V 20/58 |
| 2020/0159227 A1* | 5/2020 | Cohen | G05D 1/0212 |

FOREIGN PATENT DOCUMENTS

| | | |
|---|---|---|
| EP | 1062616 B1 | 12/2006 |
| EP | 2863177 A1 | 4/2015 |
| EP | 2428771 B1 | 1/2016 |

OTHER PUBLICATIONS

Ulrich, I., and J. Borenstein. "VFH*: Local Obstacle Avoidance with Lookahead Verification in IEEE International Conference on Robotics and Automation." San Francisco, USA (2000), p. 2505-2511.

* cited by examiner

PATH PLANNING WITHIN A TRAVERSED AREA

TECHNICAL FIELD

The presently disclosed subject matter relates to autonomic path planning.

BACKGROUND

An unmanned vehicle, also referred to as an uncrewed vehicle or an unmanned ground vehicle (UGV) is a motorized machine that travels and operates by integrating sensory data with computer-based decision making for the purpose of autonomously driving the vehicle. A UGV can be useful for applications such as moving within areas which are inconvenient, dangerous, or not possible for humans to enter, for bringing supplies or machinery, performing dangerous missions, or the like. The vehicle can in some cases carry passengers, e.g. operators that cannot see the surrounding environment and/or maneuver the vehicle.

One issue, related to the operation of UGVs concerns autonomous planning of a path from a starting point, such as a current location of a UGV, to a certain destination, in particular when the area to be traversed comprises unpassable obstacles or problematic areas which should be avoided.

GENERAL DESCRIPTION

The disclosure relates to the autonomous planning of a path for a UGV, and to steering of the UGV in accordance with the path. The path is planned in accordance with a given map of the area, and the path accuracy depends, inter alia, on the resolution and accuracy of the map.

In some applications, such as planning a path for a UGV, the map can be generated based on data received from one or more sensors mounted on the UGV, and represent an area surrounding the UGV. The map can thus be updated as the UGV advances, for example, at an update frequency between 1 and 1200 updates per second, and the path can be updated in turn in accordance with at least some of the updated maps. Since the UGV can be in continuous movement during the path planning, the path needs to be planned in real-time or near-real-time to avoid collision with obstacles, avoid delaying the progress of the vehicle, and avoid other problems resulting from advancement of the UGV in accordance with an outdated map.

According to some examples of the presently disclosed subject matter, planning a path comprises determining or receiving a starting point on the map, for example a point representing a current location of the UGV, and adding segments of a predetermined length from the starting point, in a multiplicity of directions at a first angular resolution, such as every 8°, every 15°, every 30° or the like. If any of the segments collides with an obstacle, the segment is disregarded, and a multiplicity of other segments are added starting at the starting point, at a higher angular resolution, such as every 2°, every 5°, every 15°, respectively, in the vicinity of the angle of the segment to be disregarded. For example, if the colliding segment is at an angle x, in respect to the previous segment, or to a straight line connecting the current location of the UGV with the destination, the other segments can be added at angles x-5°, x-3°, x-1°, x+1°, etc. Each such segment forms a path, where each of the paths in which the segment does not hit an obstacle is assigned a weight, and the path having the lowest weight is selected.

The process is then repeated by adding segments in a multiplicity of directions, starting at the end point of the segment of the selected path, thus forming a plurality of two-segment paths. These paths are added to the collection of previous paths, which comprises the previously generated paths which were not selected. Once segments have been added to the selected path, a weight is assigned to each path, including the paths created but not selected at an earlier stage. The path having the lowest weight is then selected.

The process continues by adding segments to the end point of the selected path, assigning a weight to each path, and selecting the path with the lowest weight, until a stopping criterion is met, such as a predetermined time has elapsed. The UGV is then steered in accordance with the path having the lowest weight.

Assigning a weight to a path can take into account various factors, such as proximity of the end point of the path to the destination, number of segments, turning angles between segments, proximity of the path to obstacles, passing through allowed but undesired areas, slopes encountered along the path, deviation from recognized roads (which may be an advantage or a disadvantage), passing through waypoints, or the like.

In some examples, a multiplicity of such collections of paths are created, each using different angle densities. For example, each collection may be generated by a different core or processor. Once the collections are generated, one path is selected from each collection. Of all selected paths, the one having the lowest weight is selected and the UGV is steered in accordance therewith.

The presently disclosed subject matter thus provides a technique of autonomous path planning and navigation of a vehicle in an area that contains obstacles. The disclosed technique provides path planning and generation that provides high resolution obstacle detection and avoidance in a time and processing efficient manner. Therefore it can be executed in real-time while the vehicle is advancing, with little or no-delay to the vehicle progression.

Thus, an aspect of the disclosed subject matter relates to a method of autonomous path planning for navigating a vehicle, the method comprising using one or more computer processing devices for receiving data indicative of a map of an area, a starting point and a destination; forming a multiplicity of paths, each path comprising a first segment starting at the starting point, each first segment proceeding at one of a multiplicity of directions, the multiplicity of directions fanned out at a first angular resolution; for each segment colliding with an obstacle indicated on the map, determining additional segments starting at the starting point and proceeding at a multiplicity of other directions fanned out at a second angular resolution, the second angular resolution being higher than the first angular resolution; assigning a weight to each of the multiplicity of paths and selecting a selected path from the multiplicity of paths in accordance with the weight, the selected path having an end point;

while a stopping criterion has not been met: adding to the multiplicity of paths a further multiplicity of paths, each including the selected path and one of a multiplicity of segments starting at the end point, each of the multiplicity of segments directed at one of the multiplicity of directions fanned out at the first angular resolution, and for each segment that collides with an obstacle indicated on the map, adding an additional multiplicity of paths comprising the selected path and additional segments starting at the end point, the additional segments directed at a multiplicity of other directions fanned out at the second angular resolution, such that each of the additional multiplicity of paths comprises the selected path and one of the additional segments; assigning a weight to each of the further multiplicity of paths and additional multiplicity of paths that does not collide with an obstacle;

and upon meeting the stopping criterion, selecting a selected path from the multiplicity of paths, in accordance with the weight; and generating steering instructions for steering the UGV in accordance with the selected path.

In addition to the above features, the method according to this aspect of the presently disclosed subject matter can optionally comprise one or more of features (i) to (xiii) listed below, in any technically possible combination or permutation:

i. Wherein the weight assigned to each path of the multiplicity of paths is determined in accordance with at least one non-angular factor.

ii. Wherein the at least one non-angular factor is selected from the group comprising: proximity of the path to an obstacle; slopes along the path; intersection of the path with areas not recommended for passing; and deviation from recognized roads.

iii. Wherein the selected path is selected as a path from a multiplicity of paths having a lowest absolute weight.

iv. Wherein the selected path is selected as a path from the multiplicity of paths having a lowest weight per segment.

v. The method further comprising creating a second multiplicity of paths, using another first angular resolution different from the first angular resolution, or another second angular resolution different from the second angular resolution, and selecting a second selected path from the second multiplicity of paths: and generating steering instructions for steering the UGV with a path selected from the selected path and the second selected path.

vi. Wherein the first angular resolution and the second angular resolution are lower than the other first angular resolution and the other second angular resolution, respectively, wherein the selected path is selected from the multiplicity of paths in accordance with a lowest absolute weight, and wherein the second selected path is selected from the second multiplicity of paths in accordance with a lowest weight per segment.

vii. Wherein the multiplicity of paths and the second multiplicity of paths are generated by different cores.

viii. Wherein the weight assigned to each path of the multiplicity of paths is determined in accordance with smoothness of the path and proximity of an end point of the path to a destination.

ix. Wherein the map is generated upon scanning data received from a scanning device mounted on the vehicle.

x. Wherein the stopping criterion is an elapsed time period.

xi. The method further comprising receiving at least one waypoint, wherein the weight assigned to each path of the multiplicity of paths is determined also in accordance with a distance of the path from each of the at least one waypoint.

xii. The method further comprising steering the UGV in accordance with the steering instructions.

xiii. Wherein any previously selected paths are excluded from selection of the selected path from the multiplicity of paths.

According to another aspect of the presently disclosed subject matter there is provided a method of navigating an autonomous vehicle using path planning, the method comprising using at least one computer processing device for receiving data indicative of a map of an area, a starting point, and a destination; forming a multiplicity of paths, each path comprising a first segment starting at the starting point, each first segment proceeding at one of a multiplicity of directions having a first angular resolution: for each segment colliding with an obstacle indicated on the map, determining additional segments starting at the starting point and proceeding in a multiplicity of other directions having a second angular resolution, the second angular resolution being higher than the first angular resolution; assigning a weight to each of the multiplicity of paths; and selecting a selected path from the multiplicity of paths in accordance with the weight, the selected path having an end point; while a stopping criterion has not been met: adding to the multiplicity of paths a further multiplicity of paths, each including the selected path and one of a multiplicity of segments starting at the end point, each of the multiplicity of segments directed at one of the multiplicity of directions having the first angular resolution, and for each segment that collides with an obstacle indicated on the map, adding an additional multiplicity of paths comprising the selected path and additional segments starting at the end point, the additional segments directed at a multiplicity of other directions having the second angular resolution, such that each of the additional multiplicity of paths comprises the selected path and one of the additional segments; assigning a weight to each of the further multiplicity of paths and additional multiplicity of paths that does not collide with an obstacle; and, upon meeting the stopping criterion, selecting a selected path from the multiplicity of paths in accordance with the weight; and steering the UGV in accordance with the selected path.

The method disclosed in accordance with the aspects of the presently disclosed subject matter detailed above can optionally comprise one or more of features (i) to (xiii) listed above, mutatis mutandis, in any technically possible combination or permutation.

According to another aspect of the presently disclosed subject matter there is provided an unmanned ground vehicle (UGV), comprising a scanning device for scanning an area surrounding the UGV, to thereby provide scanning output data providing information on distances between objects in the area and the UGV in a multiplicity of directions; a map obtaining module for receiving a map of the area, the map generated upon scanning output data received from the scanning device; a destination receiving module for receiving a destination to which the UGV has to steer; a vehicle control sub-system configured to receive vehicle control instructions and control the UGV in accordance with the instructions; and a processor configured to receive data indicative of a map of an area to be navigated, a starting point and a destination; forming by a processor a multiplicity of paths, each including a first segment starting at the starting point, each first segment proceeding at one of a multiplicity of directions having a first angular resolution; for each segment having a common point with an obstacle indicated on the map, determining additional segments starting at the starting point and proceeding in a multiplicity of other directions having a second angular resolution, the second angular resolution being higher than the first angular resolution; assigning a weight to each of the multiplicity of paths; and selecting a selected path from the multiplicity of paths in accordance with the weight, the selected path having an end point; while a stopping criterion has not been met: adding to the multiplicity of paths a further multiplicity of paths, each including the selected path and one of a multiplicity of segments starting at the end point, each of the multiplicity of segments directed at one of the multiplicity of directions having the first angular resolution, and for each segment that collides with an obstacle indicated on the map, adding an additional multiplicity of paths comprising the selected path and additional segments starting at the end point, the additional segments directed at a multiplicity of other directions having the second angular resolution, such that each of the additional multiplicity of paths comprises the selected path and one of the additional segments; assigning a weight to each of the further multiplicity of paths and additional multiplicity of paths, that does not collide with an obstacle; and, upon meeting the stopping criterion, selecting a selected path from the multiplicity of paths in accordance with the weight; and generating steering instructions for steering the UGV in accordance with the selected path.

The UGV disclosed in accordance with the aspects of the presently disclosed subject matter detailed above can optionally comprise one or more of features (i) to (xiii) listed above, mutatis mutandis, in any technically possible combination or permutation.

According to another aspect of the presently disclosed subject matter there is provided a system mountable on a UGV, comprising a processor configured to receive data indicative of a map of an area to be navigated, a starting point and a destination; forming by a processor a multiplicity of paths, each including a first segment starting at the starting point, each first segment proceeding at one of a multiplicity of directions having a first angular resolution; for each segment having a common point with an obstacle indicated on the map, determining by the processor additional segments starting at the starting point and proceeding in a multiplicity of other directions having a second angular resolution, the second angular resolution being higher than the first angular resolution; assigning, by the processor, a weight to each of the multiplicity of paths; and selecting, by the processor, a selected path from the multiplicity of paths in accordance with the weight, the selected path having an end point; while a stopping criterion has not been met: adding to the multiplicity of paths a further multiplicity of paths, each including the selected path and one of a multiplicity of segments starting at the end point, each of the multiplicity of segments directed at one of the multiplicity of directions having the first angular resolution, and for each segment that collides with an obstacle indicated on the map, adding an additional multiplicity of paths comprising the selected path and additional segments starting at the end point, the additional segments directed at a multiplicity of other directions having the second angular resolution, such that each of the additional multiplicity of paths comprises the selected path and one of the additional segments; assigning, by the processor, a weight to each of the further multiplicity of paths and additional multiplicity of paths, that does not collide with an obstacle; and upon meeting the stopping criterion, selecting by the processor a selected path from the multiplicity of paths in accordance with the weight; and generating steering instructions for steering the UGV in accordance with the selected path.

The system disclosed in accordance with the aspects of the presently disclosed subject matter detailed above can optionally comprise one or more of features (i) to (xiii) listed above, mutatis mutandis, in any technically possible combination or permutation.

According to another aspect of the presently disclosed subject matter there is provided, a method of autonomous path planning for navigating a vehicle, the method comprising using at least one computer processing device for selecting a path, comprising:
receiving data indicative of: a map of an area, a starting point and a destination;
generating, by the at least one computer processing device a first multiplicity of paths, the generating comprises:
generating a plurality of initial segments fanning out around the starting point in a first angular resolution, each of the plurality of segments proceeding at one of a multiplicity of directions;
in case an initial segment collides with an obstacle on the map, switching from the first angular resolution to a second angular resolution and generating further initial segments fanning out around the starting point, starting from a previous initial segment, in a second angular resolution, the second angular resolution being higher than the first angular resolution; wherein each initial segment represent a respective path of the first multiplicity of paths;
assigning, a weight to each of the first multiplicity of paths;
selecting. in accordance with the weight a selected path from the first multiplicity of paths, the selected path having an end point;
while a stopping criterion has not been met:
generating a plurality of additional segments fanning out from the end point in a first angular resolution, each of the plurality of segments proceeding at one of a multiplicity of directions;
in case an additional segment collides with an obstacle on the map, switching from the first angular resolution to the second angular resolution and generating further additional segments fanning out from the starting point, starting from a previous additional segment, in a second angular resolution, the second angular resolution being higher than the first angular resolution;
adding a further multiplicity of paths, each including the selected path and one of the plurality of additional segments starting at the end point,
assigning a weight to each of the further multiplicity of paths that does not collide with an obstacle: and
selecting, a (updated) selected path from the further multiplicity of paths; and
once the stopping criterion is met, generating steering instructions for steering the UGV in accordance with the (updated) selected path.

The method disclosed in accordance with the above aspect of the presently disclosed subject matter can optionally comprise one or more of features (i) to (xiii) listed above, mutatis mutandis, in any technically possible combination or permutation.

In addition to features (i) to (xiii), the method according to this aspect of the presently disclosed subject matter can optionally comprise one or more of features (xiv) to (xvii) listed below, in any technically possible combination or permutation:

xiv. wherein the selecting of the path is performed in real-time for navigating the vehicle while traversing the area.

xv. wherein the generating of a plurality of initial segments fanning out around the starting point in a first angular resolution, is performed starting at one side and continuously proceeding toward an opposite side.

xvi. wherein the generating of a plurality of additional segments fanning out from the end point in a first angular resolution, is performed starting at one side and proceeding toward an opposite side.

xvii. Where the method further comprising: during generation of the plurality of initial segment, switching back from the second angular resolution to the first angular resolution, in case it is determined that a last generated initial segment did not hit an obstacle.

xviii. Wherein the method further comprising: during generation of the plurality of additional segment, switching back from the second angular resolution to the first angular resolution, in case it is determined that a last generated additional segment did not hit an obstacle.

According to another aspect of the presently disclosed subject matter there is provided a system for autonomous path planning for autonomously navigating a vehicle, the system comprising a computer processing device configured to: receive data indicative of: a map of an area, a starting point and a destination;

generate. by the at least one computer processing device a first multiplicity of paths, the generating comprises:

generate a plurality of initial segments fanning out around the starting point in a first angular resolution, each of the plurality of segments proceeding at one of a multiplicity of directions;

in case an initial segment collides with an obstacle on the map, switch from the first angular resolution to a second angular resolution and generate further initial segments fanning out around the starting point, starting from a previous initial segment, in a second angular resolution, the second angular resolution being higher than the first angular resolution; wherein each initial segment represent a respective path of the first multiplicity of paths;

assign. a weight to each of the first multiplicity of paths;

select, in accordance with the weight a selected path from the first multiplicity of paths, the selected path having an end point;

while a stopping criterion has not been met:

generate a plurality of additional segments fanning out from the end point in a first angular resolution, each of the plurality of segments proceeding at one of a multiplicity of directions;

in case an additional segment collides with an obstacle on the map, switch from the first angular resolution to the second angular resolution and generate further additional segments fanning out from the starting point, starting from a previous additional segment, in a second angular resolution, the second angular resolution being higher than the first angular resolution;

add a further multiplicity of paths, each including the selected path and one of the plurality of additional segments starting at the end point, assign a weight to each of the further multiplicity of paths that does not collide with an obstacle: and select, a selected path from the further multiplicity of paths; and once the stopping criterion is met, generate steering instructions for steering the UGV in accordance with the selected path.

According to another aspect of the presently disclosed subject matter there is provided a UGV comprising the system above.

According to another aspect of the presently disclosed subject matter there is provided a method of navigating an autonomous vehicle using real-time path planning, the method comprising using at least one computer processing device for:

receiving data indicative of: a map of an area, a starting point and a destination;

generating, by the at least one computer processing device a first multiplicity of paths, the generating comprises:

generating a plurality of initial segments fanning out around the starting point in a first angular resolution, starting at one side and proceeding toward an opposite side, each of the plurality of segments proceeding at one of a multiplicity of directions;

in case an initial segment collides with an obstacle on the map, switching from the first angular resolution to a second angular resolution and generating further initial segments fanning out around the starting point, starting from a previous initial segment, in a second angular resolution, the second angular resolution being higher than the first angular resolution; wherein each initial segment represent a respective path of the first multiplicity of paths;

assigning, a weight to each of the first multiplicity of paths;

selecting. in accordance with the weight a selected path from the first multiplicity of paths, the selected path having an end point;

while a stopping criterion has not been met:

generating a plurality of additional segments fanning out from the end point in a first angular resolution, starting at one side and proceeding toward an opposite side, each of the plurality of segments proceeding at one of a multiplicity of directions;

in case an additional segment collides with an obstacle on the map, switching from the first angular resolution to the second angular resolution and generating further additional segments fanning out from the starting point, starting from a previous additional segment, in a second angular resolution, the second angular resolution being higher than the first angular resolution;

adding a further multiplicity of paths, each including the selected path and one of the plurality of additional segments starting at the end point, assigning a weight to each of the further multiplicity of paths that does not collide with an obstacle; and selecting. a selected path from the further multiplicity of paths; and once the stopping criterion is met, generating steering instructions for steering the UGV in accordance with the selected path.

The system, the UGV and the method disclosed in accordance with the above aspect of the presently disclosed subject matter can optionally comprise one or more of features (i) to (xvii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing". "determining", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, processors disclosed in the present application.

The terms "processor", "computer", "processing unit", "computer processing device" or the like should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and possibly a computer memory and is capable of executing various data processing operations.

The operations in accordance with the teachings herein may be performed by a computer specially constructed for the desired purposes or by a general-purpose computer specially configured for the desired purpose by a computer program stored in a computer readable storage medium.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Figure 1:
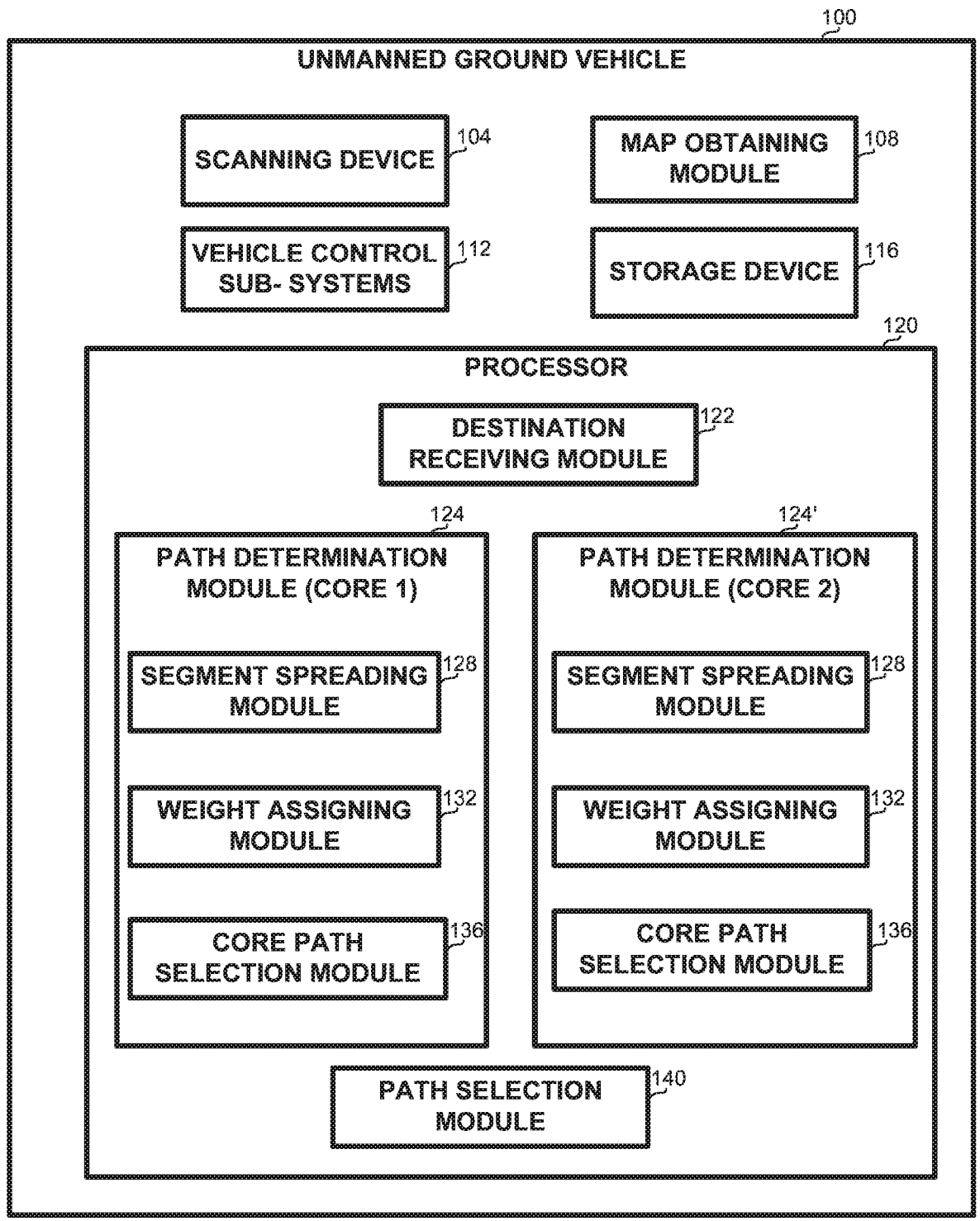
FIG. 1 illustrates a schematic block diagram of a UGV with automatic path planning, in accordance with certain examples of the presently disclosed subject matter.

FIG. 1 described below is a general schematic illustration of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location, wherein one or more of the locations can be on the UGV. In different examples of the presently disclosed subject matter, the system may comprise fewer, more, and/or different modules than those shown in FIG. 1.

Figure 3:
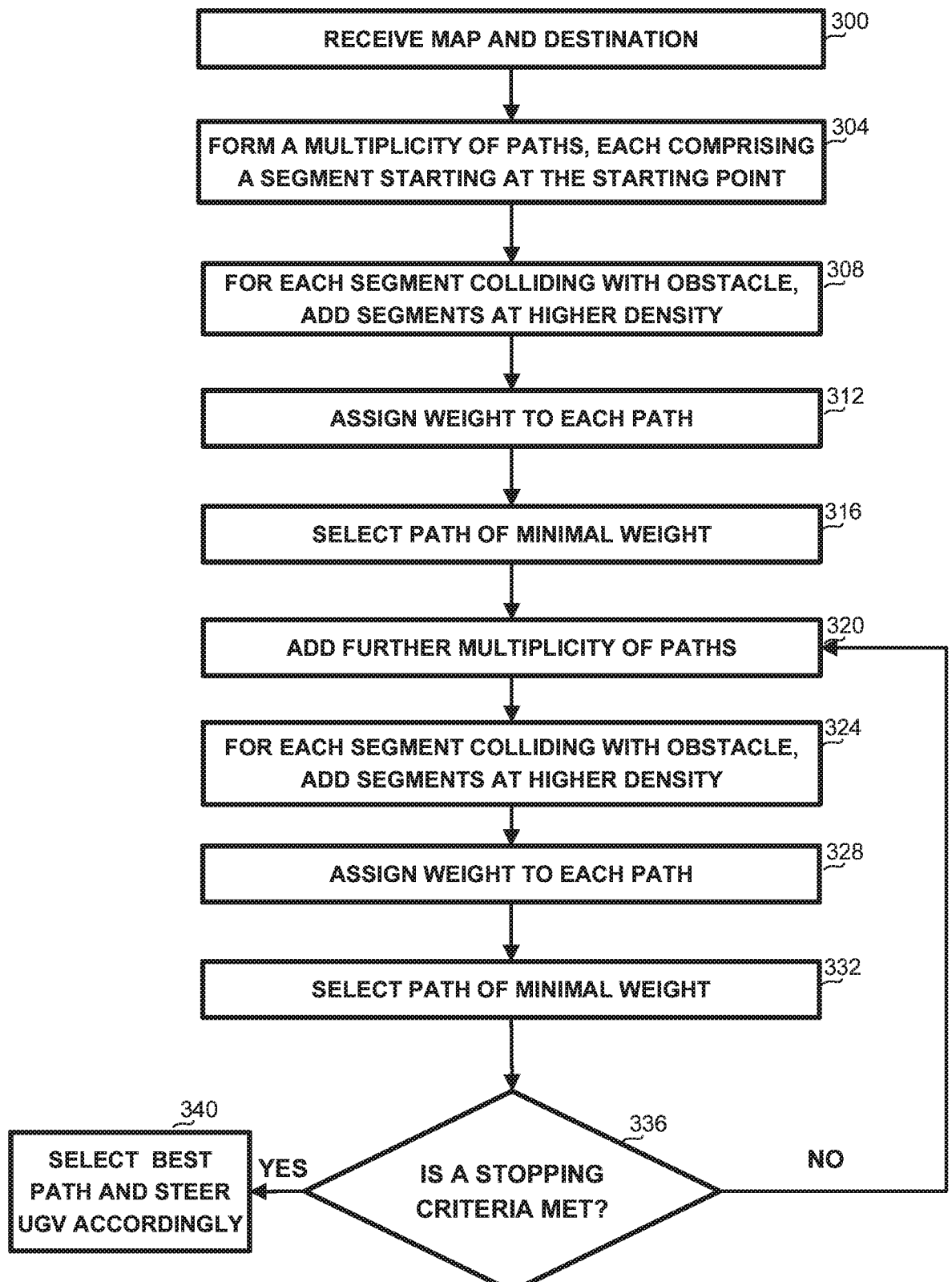
FIG. 3 illustrates a flow-chart of a method for path planning, in accordance with certain examples of the presently disclosed subject matter.

FIG. 3 described below is a flowchart illustrating operations of respective processes, in accordance with the presently disclosed subject matter. In embodiments of the presently disclosed subject matter, fewer, more and/or different stages than those shown in FIG. 3 may be executed. In embodiments of the presently disclosed subject matter, one or more stages illustrated in FIG. 3 may be executed in a different order and/or one or more groups of stages may be executed simultaneously.

The term "scanning device" as used herein should be expansively construed to cover any kind of a scanning device adapted to identify that an object is present at a specific distance and at a specific direction relative to the scanning device. Common scanning devices include 3D light detection and ranging (Lidar, also referred to as laser scanning), which relates to controlled steering of laser beams, followed by distance measurement at every pointing direction. Other known technologies include sound navigation and ranging (Sonar) or radio detection and ranging (Radar). A scanning device may output information related to obstacles around the device (360°) or at a partial range, such as 180°. In some embodiments, the scanner may provide an indication of the minimal distance at which an object is found in every direction, in a desired angular resolution.

The term "unmanned ground vehicle" (UGV) used in this patent specification should be expansively construed to cover any kind of mobile object adapted to move autonomously in an area. A UGV in accordance with the description comprises or carries thereon a scanning device for providing information on objects or obstacles surrounding the UGV, and an IMU providing measurements of the movements taken by the UGV.

The term "obstacle" used in this patent specification should be expansively construed to cover any kind of object or change in the layout of the environment that prevents a UGV from passing at the location of the obstacle. Obstacles may include positive obstacles which are generally above the ground, such as trees, buildings, persons, steep ramps or the like, and negative obstacles which are generally below ground level, for example trenches, ditches, holes, or the like.

The term "map" as used herein should be expansively construed to cover any data structure representation of a geographical area. A map may be absolute, i.e., comprise indications of absolute coordinates of an object or a location, or relative, i.e., comprise information on locations or objects, regardless of their locations in absolute coordinates. In some embodiments, a map in accordance with the disclosure may be comprised of cells, for example in the form of a grid, wherein each cell is indicated as non-traversable or traversable, i.e., comprising an obstacle to a UGV or not. A map can be a two-dimensional map indicating for each X-Y location whether it is an obstacle or not, a three dimensional map indicating for each X-Y-Z location whether it is an obstacle or not, or a 2.5 dimensional map, indicating for each X-Y location the height of the lowest obstacle above that point, i.e., the clearance height above the point.

A map may have a visual representation on a computerized display device, paper, or any other tangible medium.

In the following description some examples describe a lowest weight value as desirable. It is noted that this is done by way of example only and in other examples a highest weight value may be desirable.

Reference is now made to FIG. 1, showing a schematic block diagram of a UGV, in accordance with some examples of the disclosure.

UGV 100 can comprise or be otherwise operatively connected to a scanning device 104 configured to scan an area surrounding the vehicle, and provide scanning output data for generating a map. A map of a scanned area may be constructed such that it contains an area surrounding UGV 100, for example centered around UGV 100. UGV 100 can comprise vehicle control sub-systems 108 including for example steering control unit, gear control unit, throttle control unit, etc. Vehicle control sub-systems 108 are configured to receive vehicle control instructions (e.g., steering commands) and control UGV 100 accordingly. The instructions can be absolute or relative, for example an absolute instruction can be "go 20 meters north", while a relative instruction can be "continue straight for 20 meters" or "throttle 30%, yaw rate 50%".

UGV 100 can further comprise or be otherwise operatively connected to computer storage device 112 for storing information such as one or more maps, a destination point, information on obstacles, navigation instructions, binary modules, or the like.

UGV 100 can further comprise or be otherwise operatively connected to one or more processing units such as processor 116 for controlling and executing various operations, as disclosed herein. Each processing unit comprises a respective processing circuitry comprising at least one computer processor which can be, for example, operatively connected to a computer-readable storage device such as storage device 112 having computer instructions stored thereon to be executed by the computer processor.

According to some examples, different functional elements (units, modules, executables) in UGV 100 can be implemented as a dedicated processing unit comprising dedicated computer processor and computer storage for executing specific operations.

Additionally or alternatively, one or more functional elements can be operatively connected to a common processing unit configured to execute operations according to instructions stored in the functional elements. For example, processor 120 can comprise one or more computers or processing units, which can be configured to execute several functional modules in accordance with computer-readable instructions stored on a non-transitory computer-readable medium (e.g. storage device 112) operatively connected to processor 120. For illustrative purposes such functional modules are referred to hereinafter as comprised in the processor.

Processor 116 can comprise or be otherwise operatively connected to map obtaining module 120. Map obtaining module 120 can be operative in generating a map based on the readings received from scanning device 104, or another source of information. The size of the area represented by the map can be in accordance with the range at which scanning device 104 can scan. In alternative embodiments, map obtaining module 120 can be operable for receiving a map from an external source, for example via a communication channel.

Processor 116 can comprise destination receiving module 122, for receiving, for example from an external source via a communication channel, a destination to which a UGV has to arrive, and optionally one or more waypoints, i.e., points which the path has to go through. The received data can also include various instructions. e.g., whether the path should include the exact waypoints or pass at some maximal distance therefrom. In some embodiments, an initial path may be received, for the purpose of serving as a basis for planning the path.

In some examples, processor 116 can be implemented as a multi-core processor comprising two or more cores, each core configured to execute a respective instance of path determination module (124, 124', etc.). The number of instances can be selected to correspond to the number of available cores. If a single core is available, then an implementation with a single instance of path determination module 124 may be used.

The various instances can differ in operational parameters of the path planning, for example: in the angular resolutions in which segments are spread out from one or more points when constructing the map, in the manner in which a path weight is determined, or the like.

Although the description below relates to a single core implementation of processor 116 it will be appreciated that it is equally applicable to a multi-core implementation of processor 116.

According to some examples, path determination module 124 can comprise segment spreading module 128, weight assigning module 132 and core path selection module 136.

Segment spreading module 128 can receive a path having a starting point and an end point, and comprising zero, one or more segments each having a starting point and an end point, and create therefrom a multiplicity of paths by appending a multiplicity of segments to the end point of the given path.

Weight assigning module 132 is configured to assign a weight to each of the multiplicity of created paths. In the description below, a lower weight indicates a better path, however different implementations can also be used.

The weight can be calculated based on a combination of a number of factors, as detailed below.

Core path selection module 136 is configured to select from all created paths a path having the lowest weight (or highest, if an alternative implementation is used).

If the end point of the selected path is other than the destination, then segment spreading module 128, weight assigning module 132 and core path selection module 136 may be repeatedly executed until the destination is reached or until a stopping criterion has been encountered, such as a predetermined time period has elapsed. According to some examples, segment spreading module 128 uses the end point of the path selected by core path selection module 136 as a starting point for adding further segments.

If a multi-core processor is being used i.e., multiple instances of path determination module 124 or 124' are executed, then when the stopping criteria is met, path selection module 140 selects the path of the lowest weight from among all paths selected by core path selection module 136.

According to some examples, if a single core processor is used, path selection module 140 may not be used and selection is made by path selection module 136.

Figure 2:
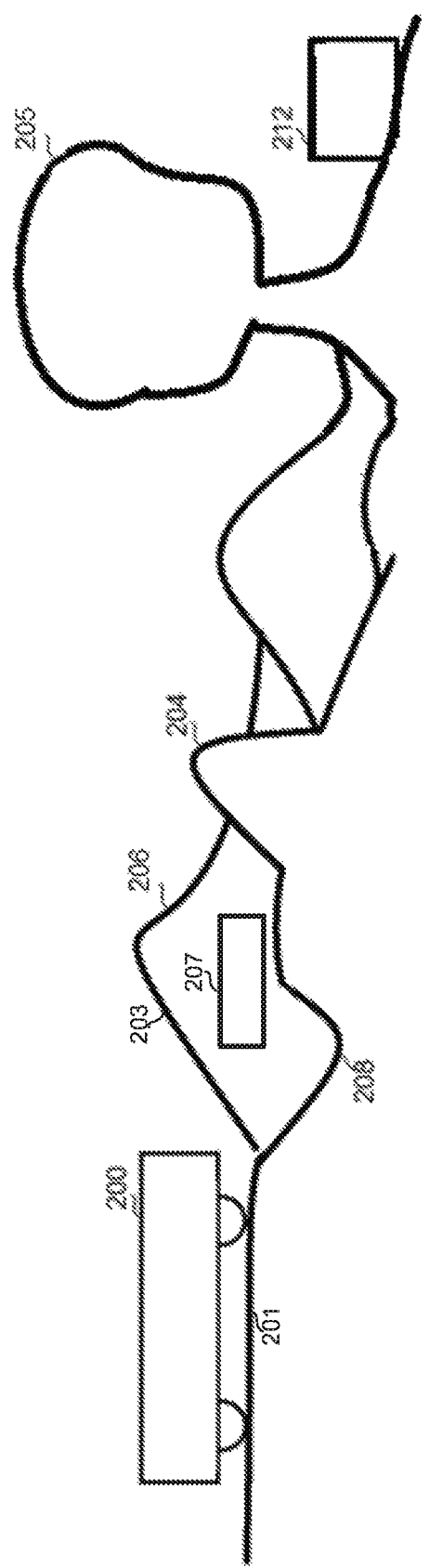
FIG. 2 illustrates a schematic illustration of an environment in which a UGV has to navigate.

Referring now to FIG. 2, this shows a schematic illustration of an example of an environment in which UGV 200 has to navigate from a current location 201 to destination 212. The environment may comprise obstacles such as building 207, terrain obstacles including: positive obstacle 204, which is above ground level and may have a steep slope; negative obstacle 208 which is below ground level; overhead obstacle 205 such as a tree or a bridge, which UGV 200 can pass below some parts of; and steep terrain 206 which may be for example a back, side or front slope. All these obstacles are non-traversable for UGV 200 and a path to destination 212 should therefore avoid them. In addition, areas such as slope 203 may be possible but not recommended for the UGV to traverse. Notably, some objects can present an obstacle when accessed from one side, but not when accessed from another side. For example, a ramp may present an obstacle when accessed from the side, but not when accessed from the front or back.

A map of the environment, which depicts the area in a certain resolution, can be generated based on scanning output data received from a scanner. A path to a destination point can then be planned according to the map.

Figure 4A:
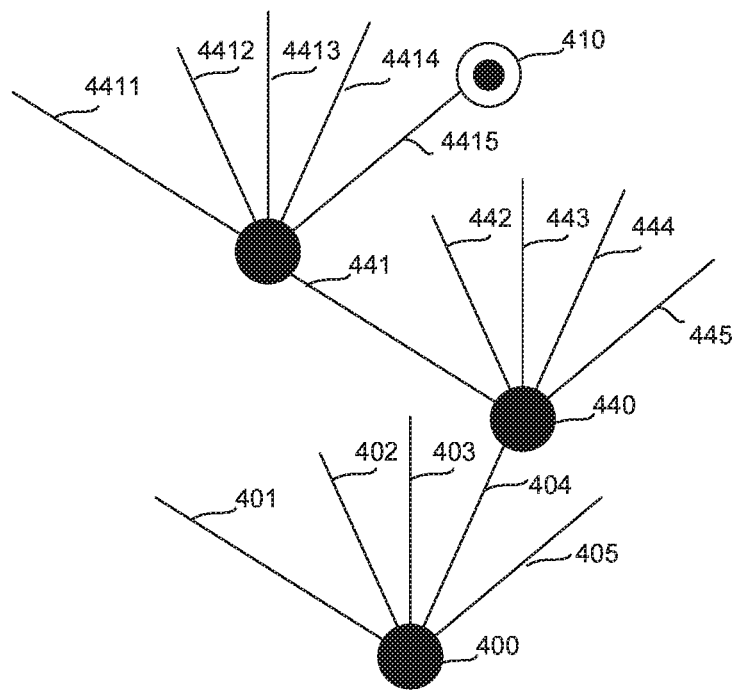
FIG. 4A provides a first graphical demonstration of a path planning example, in accordance with certain examples of the presently disclosed subject matter.
Figure 4B:
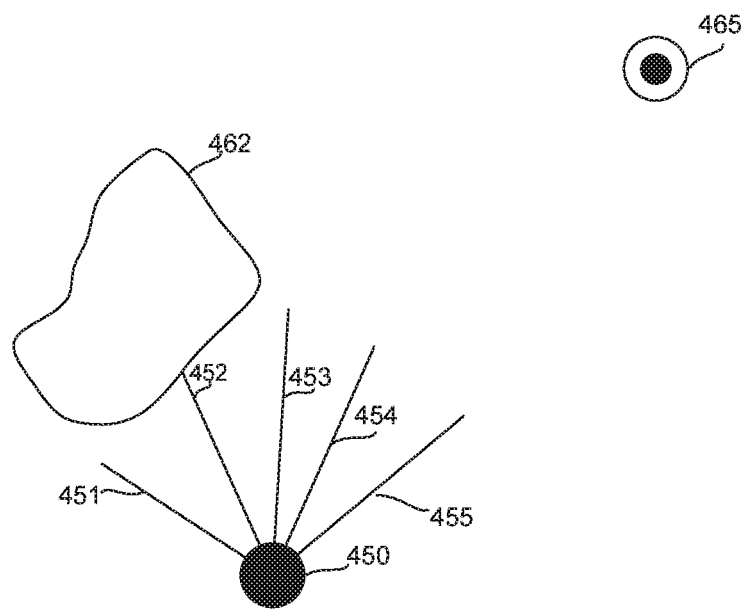
FIGS. 4B-4F provide a second graphical demonstration of a path planning example, in accordance with certain examples of the presently disclosed subject matter.

Reference is now made to FIG. 3, showing a flowchart of a method for planning a path in an environment with obstacles, and to FIGS. 4A and 4B, showing graphical demonstrations of an example of path planning in accordance with the method.

At block 300, a map of the environment to be navigated, including data indicating the current location and a navigation destination, is received. The map can also include obstacles or other features of the environment. In some examples, the map can be received by map obtaining module 108, and the destination can be received by destination receiving module 122, or as indication on the map. It will be appreciated that the map can assume various formats such as a data structure, an image from which the current location, the destination and obstacles can be retrieved, or the like. The map can be generated according to the scanning data output received from the scanner, based for example on the time intervals it takes one or more scanning beams to return the scanner after having hit an obstacle or another feature.

Thus, the received map can depict current location 400 and destination 410 as shown in FIG. 4A, or current location 450 destination 465 and obstacles 460 and 462 as shown in FIG. 4B.

In some embodiments, one or more waypoints indicating the pathway to the destination may be provided as well. Each such waypoint may be indicated as "compulsory", meaning that the UGV has to pass exactly at the point, or as "approximate", meaning that the UGV has to pass at some maximal distance from the point. In the latter case, the weight of a path can be affected by the proximity between the waypoint and the actual point of the path closest to the waypoint. If the pathway includes compulsory waypoints, then planning can be divided into a multiplicity of sub-path planning stages, each sub-path connecting two such waypoints.

As a preliminary step, it can be determined whether the UGV can travel along a substantially straight line to the destination without hitting an obstacle or getting into undesired areas or situations. If such a path is possible, it may be selected, and path planning is not executed.

At block 304, a multiplicity of paths starting at the current location of the UGV, each comprising one segment, are created (e.g. by segment spreading module 128).

FIG. 4A shows segments 401, 402, 403, 404 and 405 fanning out from location 400 (starting point), and FIG. 4B shows segments 451, 452, 453, 454 and 455 fanning out from location 450.

In some examples, the path can be created as one or more data structures indicating the current location of the UGV as a starting point, and comprising a segment of a predetermined length in a determined direction. In each such path, the segment is added in a different direction than in other paths, such that a fan-like collection of segments is spread. The segments may be long enough to provide significant advancement of the UGV without necessitating excessively frequent turns, and short enough to enable spreading a large number of paths since each path is comprised of a large number of segments, thus enabling the creation of a dense network of paths, and checking a multiplicity of options. For example, a segment length of half the UGV size may be selected. In other examples, a segment length of between about 1 meter and about 10 meters may be selected.

The segments are spread at a first angular resolution, for example every 8°, every 15°, every 30°, or any other angular resolution. The segments can be spread in 360° (referred to herein also as "processing angle") around the current location of the UGV, but in other implementations may be limited to another angle range, such as +/−90° relative to a vector pointing from the current location to the destination.

At block 308, each segment colliding with an obstacle, is disregarded from further computations, and replacement segments are added at second angular resolution, which is finer than the first angular resolution. (e.g. by segment spreading module 128). In the example illustrated in FIG. 4B, segment 452 collides with obstacle 462. Determination whether a segment collides with an obstacle can be performed based on the position of the UGV relative to an obstacle and the direction and distance of the segment (e.g. by segment spreading module 128).

Figure 4C:
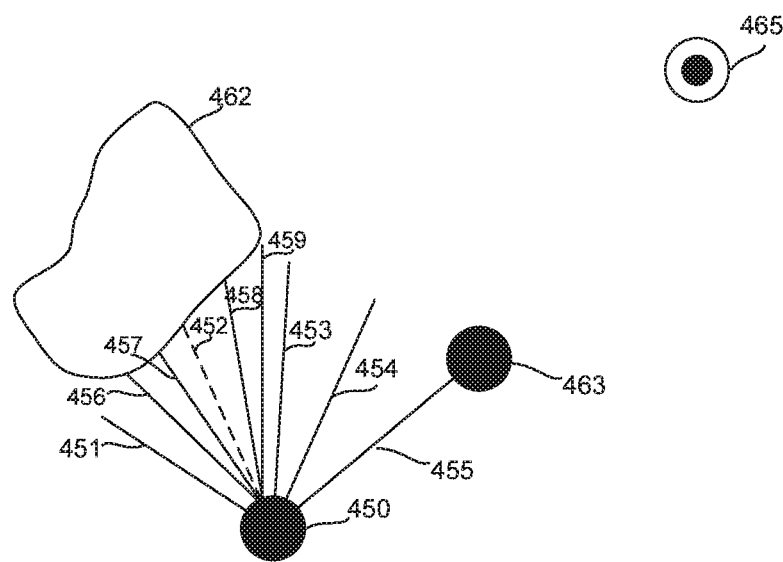

Thus, as shown in FIG. 4C, the path comprising segment 452 is disregarded and replacement segments 456, 457, 458 and 459 are added, out of which segments 456, 457 and 458 also hit the obstacle, but segment 459 does not. Segments 456, 457, 458 and 459 may be spread at positive or negative angles relative to segment 452, and are spread at higher angular resolution than the angular resolution of segments 451, 452, 453, 454 and 455, for example an angular resolution twice as high or three times as high as the previous angular resolution, or the like. The higher angular resolution enables the scanning to find relatively smaller passes or spaces between two obstacles, or the like.

In some examples, a higher first angular resolution corresponds to higher second angular resolution. Thus, for example, if the first angular resolution is 8°, the second angular resolution can be 2°, if the first angular resolution is 15°, the second angular resolution can be 50, or the like.

In examples in which multiple cores are available, each core can operate with a set of first and second angular resolutions different from those used by other cores.

At block 312, a weight is assigned to paths that do not collide with an obstacle, for example by weight assigning module 128. Thus, in FIG. 4A a weight is assigned to the paths comprising segments 401, 402, 403, 404 and 405, and in FIG. 4C a weight is assigned to the paths comprising segments 451, 459, 453, 454 and 455.

The weight can be calculated based on a combination of a number of factors, including but not limited to any one or more of the factors listed below:

The distance between the end point of each path and the destination, wherein a smaller distance implies a lower weight;

Advancement along a basic path, if one is provided, e.g., the point on an initially given path which is closest to each path. It will be appreciated that points farther along the given path contribute to lower weight;

The distance between the latest segment added to the path and the basic path, if one is provided, measured for example as the distance between the last segment and the line connecting two waypoints along the path. A higher weight may be assigned to a path that is drifting away from the given path;

Proximity between each waypoint provided as input (if any) and a waypoint along the path, i.e., one of the points from which segments are spread, which is nearest to the given waypoint;

Smoothness of a path, e.g., angles between consecutive segments along a path, wherein sharper angles imply a higher weight as they indicate sharp turns of the UGV, which are generally undesired;

Non-angular factors, including but not limited to:

Proximity of the path to any one or more of the obstacles: this measurement may be determined by virtually increasing the size of the vehicle by one or more virtual envelopes, also referred to as virtual layers, surrounding the vehicle, each having a predetermined width. In an example in which an internal and an external layer are considered, a planned path in which the external layer hits an obstacle indicates that the UGV is at a distance from the obstacle which is between the width of the internal layer and the sum of the widths of the two layers. A planned path in which the internal layer hits the obstacle indicates that the UGV is at a distance from the obstacle which is at most the width of the internal layer. Thus, in the latter case, the UGV is closer to the obstacle than in the former case. The virtual layers provide for forcing the path to remain in at least a predetermined distance from an obstacle, thus ensuring that the UGV does not come into contact with the obstacle. The proximity of the UGV to the obstacles may be discretized by considering, in the weight calculation, which virtual layer hit the obstacle, rather than the exact distance between the UGV and the obstacle.

Slopes of the ground the UGV has to traverse along the path;

Entry into areas which are allowed but are undesired, such as privately owned areas, nature reserves, or the like; and Deviating from recognized roads, which may be desired or undesired, according to the situation. For example, a heavy UGV may damage a road and should thus avoid recognized roads as much as possible, while a light UGV should remain on roads for easier movement.

The weight can be calculated using a linear combination of the used factors with weights assigned for each factor, normalized sums, averaged sums, or any other combination. If minimal weight is desired, the desirable weight factor should have lower weight values.

As detailed below, in some situations the weight may be calculated for each path as a whole, regardless of how many segments the path is comprised of, while in other situations the weight may be determined per segment.

At block 316, a path having a minimal weight is selected, for example by path selection module 136. Thus, in the example illustrated in FIG. 4A the path ending at location 440 is selected, and in the example of FIG. 4C the path ending at location 463 is selected. These paths may have been selected since their end points are closest to the respective destinations, since they keep away from areas having steep slopes more than other paths, or due to other factors.

At block 320, a multiplicity of paths is added (e.g. by segment spreading module 128), by adding segments at the first predetermined angular resolution at the end point of the selected path, such that each new path is comprised of the selected path and an additional segment directed as described in association with block 304 above. In this case, unlike the case of segments starting at the current location of the UGV, the angles at which the additional segments are directed may be limited relatively to the previous segment of the path, for example limited to being at +/−90° relative to the previous segment. Thus, in FIG. 4A, additional paths are added, in which segments 441, 442, 443, 444, and 445 are added to the selected path starting at location 440.

Figure 4D:
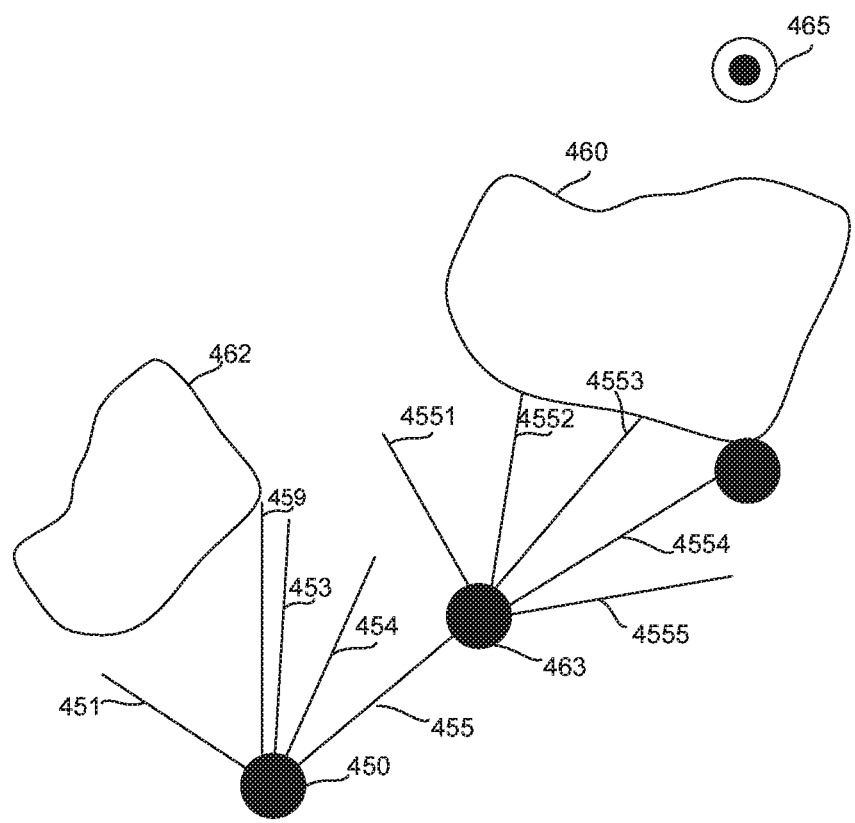

In FIG. 4D, segments 4551, 4552, 4553, 4554 and 4555 can be added to the path including segment 455.

Figure 4E:
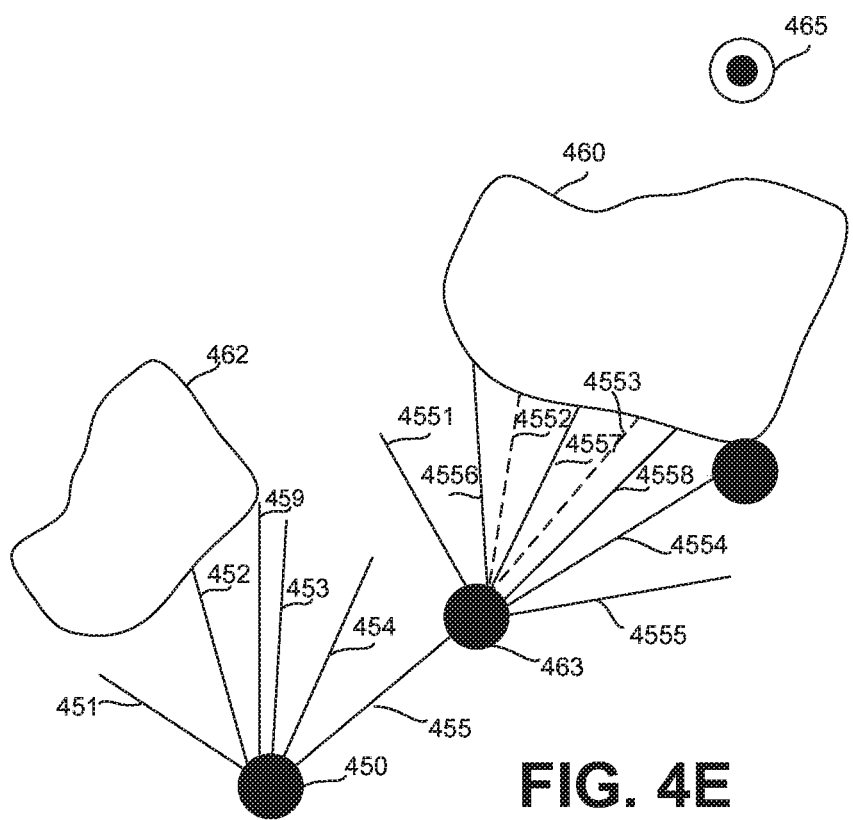

At block 324, for each newly added segment that collides with an obstacle, additional segments are added at the second, higher, angular resolution, for example by segment spreading module 128. Thus, since segments 4552 and 4553 collide with obstacle 460, then, as seen in FIG. 4E, segments 4552 and 4553 are disregarded and segments 4556, 4557 and 4558 are added, all of which also collide with obstacle 460 and are thus likewise disregarded. At block 328, a weight is assigned to each path, including the paths not previously selected, for example by weight assigning module 132. Thus, weights are assigned to the paths comprised of the following segments of FIG. 4A: 401, 402, 403, 405, 404+441, 404+442, 404+443, 404+444, and 404+445. The paths to which weights are assigned on FIG. 4E are the paths comprised of the following segments or segment combinations: 451, 459, 453, 454, 455+4551, 455+4554, and 455+4555. According to some examples, if a weight has been previously assigned to a path, and there is no change in the weight calculation parameters, then re-calculating a weight may be avoided and a previously calculated weight may be used. It will be appreciated that according to some examples, weights are not assigned to paths ending with a segment colliding with an obstacle, such as 452 or 455+4552. It will also be appreciated that weights are not assigned individually to paths that have been previously selected and have thus been extended with additional segments, such as 455.

If all segments added to the selected path collide with an obstacle, path selection can select only among previously obtained paths, such that another fan of segments will be opened from the same level. For example, if segments 441, 442, 443, 444 and 445 all collide with one or more obstacles, the selection is between paths 401, 402, 403 and 405, for example 401, and a fan of segments will be spread from the end point of segment 401, similar to the fan of segments attempted to be opened from the end point of segment 404, being location 440.

The weights assigned to multi segment paths, such as 455+4551, can take into account also the angles between pairs of consecutive segments, since sharp turns are generally undesired.

In some embodiments, the weight of a path may be calculated as the sum of all parameters, regardless of the number of segments the path is comprised of. However, since the weight may increase as the number of segments increases, or some of the parameters may relate to a single segment, such as the angles between consecutive segments along a path, the weights of paths having more segments than others may be high relative to other paths having fewer segments, thus providing skewed results. In order to compensate for such situations, in some examples the total weight of a path may be divided by the number of segments in the path, thus providing a more uniform measure of the path quality. Whether the weight is calculated per-segment or not may be decided per each core individually. In some examples, in cores operating with a larger angle resolution, which therefore cover larger areas, a relative weight may be used. i.e. the weight may be divided by the number of segments, while cores operating with smaller angle resolution may operate with total weight for the path.

At block 332 a path of minimal weight is selected (e.g. by core path selection module 136) whether each weight has been determined per path or per segment. It will be appreciated that path selection is not limited to paths having the largest number of segments, but also to paths that on at least one previous iteration have not been selected for further execution of segment spreading module 128. In the example FIG. 4A the path comprising of segments 404+441 can be selected, and in the example FIG. 4E the path comprising of segments 455+4554 can be selected. It will be appreciated that the path selection may not be self-explanatory from the figures, since some factors that affect the weight are taken into account by the weight calculation, although they are not depicted.

At block 336 it can be determined whether a stopping criterion has been met. One such stopping criterion is the elapsing of a predetermined time period since the beginning of the map planning (e.g. between 0.1 second and 2 seconds). This parameter is significant since the UGV needs to receive steering instructions in order not to stop or not to keep moving in accordance with instructions provided upon outdated map and path, which can lead to colliding with obstacles, hitting moving objects such as people, entering undesired areas, or the like.

If the stopping criterion is met, then if multiple cores are used, at block 340 the best path is selected from the selected paths provided by the different cores, steering instructions are generated, and the UGV is steered in accordance with the best path. If only one core is used, then the best path is the selected path.

Figure 4F:
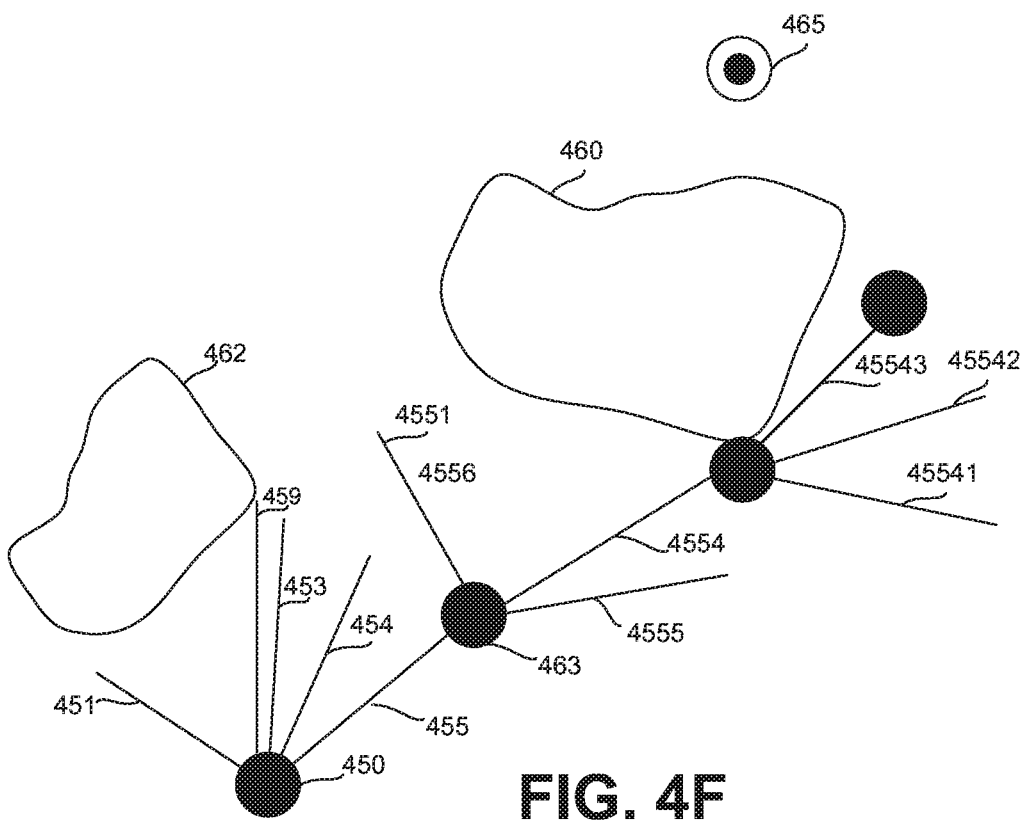

If the stopping criterion is not met, the process may continue with another iteration of adding a further multiplicity of paths at block 320. Thus, in FIG. 4A, segments 4411, 4412, 4413, 4414 and 4415 can be added to the path including segments 404 and 441. In FIG. 4F, segments 45541, 45542 and 45543 can be added to the path including segments 455+4554.

Weights are then assigned to each path on block 324 by weight assigning module 132. Thus, weights are assigned to the following paths of FIG. 4A (or only to the paths to which a weight has not been assigned earlier): 401, 402, 403, 405, 404+442, 404+443, 404+444, 404+445, 404+441+4411, 404+441+4412, 404+441+4413, 404+441+4414, and 404+441+4415, and to the following paths of FIG. 4B: 451, 453, 454, 455+4551, 455+4555, 455+4554+45541, 455+4554+45542, and 455+4554+45543.

On block 328 the path of the lowest weight is selected. In the example of FIG. 4A the path including segments 404+441+4415, which reaches destination 410 is selected. In the example of FIG. 4B, the path including segments 455+4544+45543 is selected.

When a new map is received, planning a path can be repeated, and the UGV is then steered in accordance with the newly planned path. Thus, the predetermined period of time used as the stopping criterion can correspond to the refresh rate of the map, which in turn depends on the scanning rate of the scanning device and the map generation rate.

However, in some embodiments, path planning can be avoided for every second, third, or other received map, if the UGV is in an area in which no obstacles or other undesired objects exist, or the like.

Figure 6:
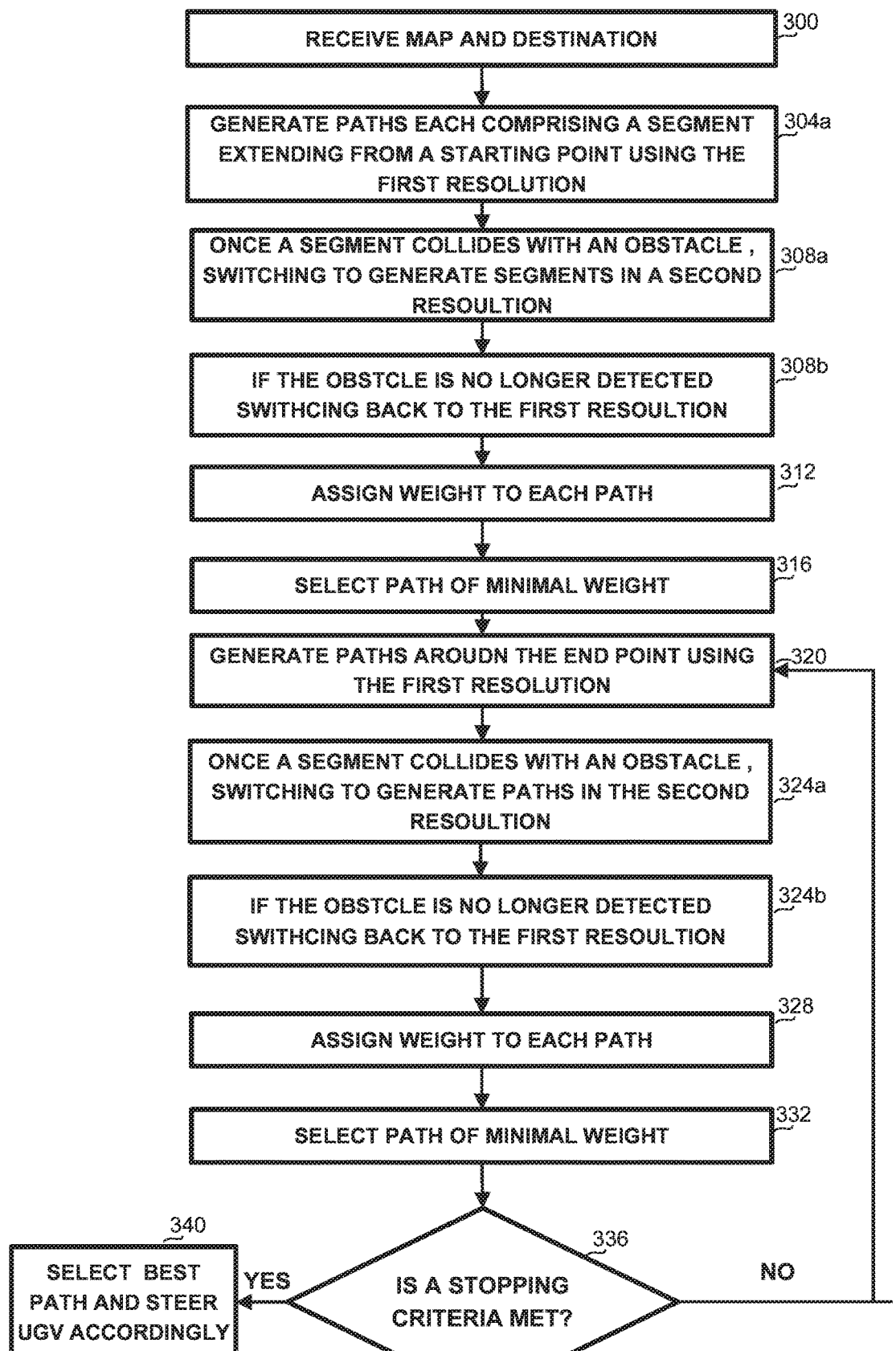
FIG. 6 illustrates another flow-chart of a method for path planning, in accordance with certain examples of the presently disclosed subject matter.

Reference is now made to FIG. 6, showing a flowchart a method for planning a path in an environment, in accordance with the method. The method disclosed with reference to FIG. 6 provides some alternatives to the method disclosed with reference to FIG. 3. Some operations which are identical to corresponding operations in FIG. 3 are not described in detail. Unless described otherwise, the examples shown in FIGS. 4A-4F are likewise applicable to the operations in FIG. 6. Operations described with reference to FIG. 6 can be executed for example by processor 120.

Figure 5A:
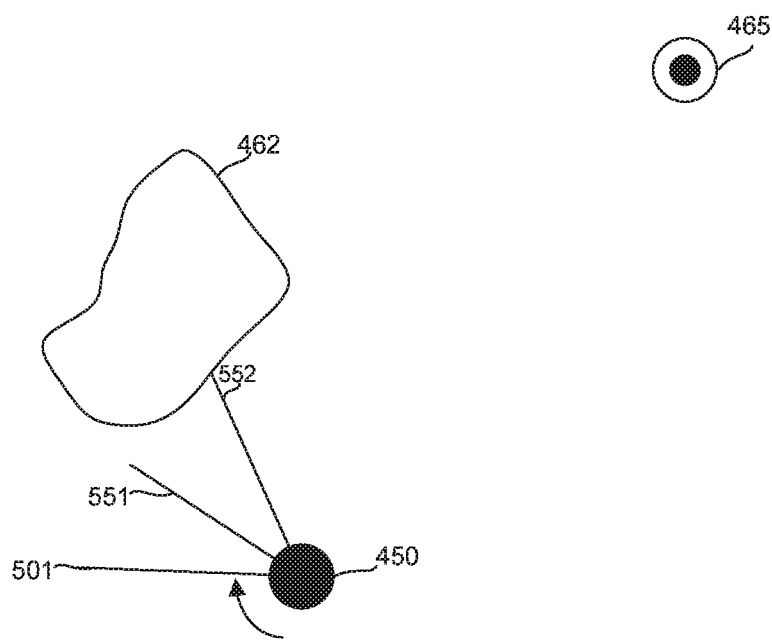
FIG. 5A-5B provide a third graphical demonstration of a path planning example, in accordance with certain examples of the presently disclosed subject matter.
Figure 5B:
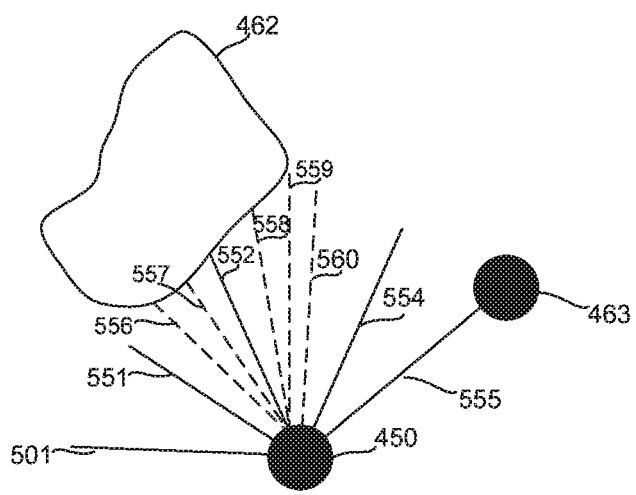

At block 300, a map of the environment to be navigated, is received. The received map can depict current location 450 destination 465 and obstacles 462 as shown in FIGS. 5A and 5B.

In some embodiments, one or more waypoints (e.g. "compulsory" or "approximate") indicating the pathway to the destination may be provided as well.

As a preliminary step, it can be determined whether the UGV can travel along a substantially straight line to the destination without hitting an obstacle or getting into undesired areas or situations. If such a path is possible, it may be selected, and path planning is not executed.

At block 304*a*, one or more paths starting at the starting point (e.g. current location of the UGV) each comprising one segment, are created (e.g. by segment spreading module 128). The path can be generated by extending segments (also referred to herein as "initial segments") around the starting point, for example, in a fan like shape, starting from one side and proceeding towards the other, each segment having a certain direction relative to the vehicle. As mentioned above, segments are initially generated using a first angular resolution ("course scanning resolution"), for example every 8°, every 15°, every 30°, or any other angular resolution. The segments can be spread in 360° (herein also "processing angle") around the current location of the UGV, but in other implementations may be limited to another angle range, such as +/−900 relative to a vector pointing from the current location to the destination.

According to an example, at block 308*a*, while segments are being generated from one side to the other using the first angular resolution, immediately after a segment colliding with an obstacle is detected, the process reverts back to the previous segment that did not hit an obstacle and the scanning resolution is switched from the first angular resolution to a second angular resolution. The second resolution is finer than the first angular resolution ("fine scanning resolution"). For example an angular resolution twice as high or three times as high as the previous angular resolution, or the like. The higher angular resolution enables the scanning to find relatively smaller passes or spaces between two obstacles, or the like. Scanning proceeds with the fine scanning resolution until the obstacle is no longer detected or until the end of the processing angle is reached.

FIG. 5A shows generation of (initial) segments (501, 552 and 552) from left to right (as indicated by the arrow) using the course angular resolution, where the second segment 552 hits obstacle 462. FIG. 5B shows the response following determination that an obstacle has been hit. As shown in the figure, immediately after detection of an obstacle, the process reverts to the location of to the previous segment (551), and starts generating segments from left to right, from that position using the finer scanning resolution, thereby generating segments 556, 557, 558, 559 and 560 (indicated by broken lines). In some examples, generation of segments in the fine resolution starting from a previous segment that did not hit the obstacle, starts exactly from the previous segment (e.g. 551), while in other examples, generation of segments in the fine resolution starting from a previous segment that did not hit the obstacle, starts near the previous segment. "near" is a distance that can be defined for example, according to the fine resolution e.g. a distance defined by an angle that is equal or smaller than the fine resolution.

At block 308*b*, the process switches back from the finer resolution to the course resolution. As mentioned above, this happens in case an obstacle is no longer detected. FIG. 5B switching back from the finer resolution to the course scanning resolution after segment 560 where the obstacle is no longer detected. Segments 554 and 555 following 560 are separated according to the course scanning resolution. Thus, in some examples, if it is determines that the last initial segment did not hit an obstacle, a command to switch to the first angular resolution is given (e.g. by processor 120) and during the processing along the remainder of the scanning angle, the course scanning resolution is used.

By switching from course scanning resolution to fine scanning resolution and vice versa, the process enables to detect smaller elements (e.g. obstacles and openings) on one hand and reduce consumption of processing resources as well processing time on the other hand.

As mentioned above, in examples in which multiple cores are available, each core can operate with a set of first and second angular resolutions different from those used by other cores.

At block 312, a weight is assigned to paths that do not collide with an obstacle, for example by weight assigning module 128. Thus, in FIG. 5B a weight is assigned to the paths comprising segments 551, 560, 554, and 555.

The weight can be calculated based on a combination of a number of factors, as listed above with reference to block 312. The weight can be calculated using a linear combination of the used factors with weights assigned for each factor, normalized sums, averaged sums, or any other combination. If minimal weight is desired, the desirable weight factor should have lower weight values.

As detailed below, in some situations the weight may be calculated for each path as a whole, regardless of how many segments the path is comprised of, while in other situations the weight may be determined per segment.

At block 316, a path having a minimal weight is selected, for example by path selection module 136. The examples illustrated in FIG. 4C can be likewise applied herein. The selected path having an end point located at its end.

At block 320, a multiplicity of paths are generated (e.g. by segment spreading module 128), by repeating the scanning operation as described in association with block 304*a* above. This time additional (also referred to herein as "subsequent segments") segments are generated fanning out around the end point of the selected path. In some examples, unlike the case of segments starting at the current location of the UGV, the angles at which the additional segments are directed may be limited relatively to the previous segment of the path, for example limited to being at +/−90° relative to the previous segment.

At block 324*a*, the operations described above with respect to block 308*a* are repeated, where once an additional segment that collides with an obstacle is detected, the process switches to the fine scanning resolution and starts generating additional segments, using the fine scanning resolution, starting from the location of the previous segment or "near" the previous segment as explained above (e.g. by segment spreading module 128). At block 324*b* the process switches back to the course scanning resolution, in case the obstacle is no longer detected.

As explained above with reference to FIG. 3, at block 328, a weight is assigned to each path, including the paths not previously selected, for example by weight assigning module 132. According to some examples, if a weight has been previously assigned to a path, and there is no change in the weight calculation parameters, then re-calculating a weight may be avoided and a previously calculated weight may be used.

At block 332 a path of minimal weight is selected (e.g. by core path selection module 136) whether each weight has been determined per path or per segment.

At block 336 it can be determined whether a stopping criterion has been met. One such stopping criterion is the elapsing of a predetermined time period since the beginning of the map planning (e.g. between 0.1 second and 2 seconds). This parameter is significant since the UGV needs to receive steering instructions in order not to stop or not to keep moving in accordance with instructions provided upon outdated map and path, which can lead to colliding with obstacles, hitting moving objects such as people, entering undesired areas, or the like.

If the stopping criterion is met, then if multiple cores are used, at block 340 the best path is selected from the selected paths provided by the different cores, steering instructions are generated, and the UGV is steered in accordance with the best path. If only one core is used, then the best path is the selected path.

If the stopping criterion is not met, the process may continue with another iteration of adding a further multiplicity of paths at block 320. Weights are then assigned to each path on block 324 (e.g. by weight assigning module 132).

On block 328 the path of the lowest weight is selected. When a new map is received, planning a path can be repeated, and the UGV is then steered in accordance with the newly planned path. Thus, the predetermined period of time used as the stopping criterion can correspond to the refresh rate of the map, which in turn depends on the scanning rate of the scanning device and the map generation rate.

However, in some embodiments, path planning can be avoided for every second, third, or other received map, if the UGV is in an area in which no obstacles or other undesired objects exist, or the like.

It will be appreciated that the two angular resolution segment addition mechanism disclosed herein allows to keep the path planning fast and efficient where possible, e.g., in areas without obstacles, or in which it is relatively easy to avoid obstacles, while enabling navigation through areas with dense obstacles, such that narrow passes can be detected through which the UGV can pass. The disclosure thus provides for efficient, smooth, continuous and collision free progress of the autonomous vehicle through a traversed area.

It will also be appreciated that the weighting mechanism assigning weight to parameters of the path such as proximity from obstacles, enforced for example by virtual layers that can be added around the UGV, passing near waypoints, attempting to avoid steep slopes, attempting to avoid undesired areas, or the like, provide for planning a path that keeps the UGV safe from obstacles, whether these are buildings, trees, people, or the like, and of the environment, such as roads.

It is noted that the teachings of the presently disclosed subject matter are not bound by the steps described with reference to FIG. 3 and the components described with reference to FIG. 1. Equivalent and/or modified functionality can be consolidated or divided in another manner and can be implemented in any appropriate combination of software, firmware and hardware and executed on a suitable device.

Those skilled in the art will readily appreciate that various modifications and changes can be applied to the embodiments of the invention as hereinbefore described without departing from its scope, defined in and by the appended claims.

The invention claimed is:

1. A method of autonomous path planning for navigating a vehicle, the method comprising while traversing an area using at least one computer processing device for:
   receiving data indicative of:
      a map of the area, a starting point in the map, and a destination in the map;
   generating a path leading to the destination comprising:
      determining a plurality of initial segments fanning out from the starting point in a first angular resolution, each of the plurality of initial segments proceeding at one of a multiplicity of directions;
      if an initial segment intersects with an obstacle indicated on the map, determining additional initial segments fanning out from the starting point in a second angular resolution that is higher than the first angular resolution;
      wherein each initial segment represents a respective path, giving rise to a multiplicity of paths;
      assigning a respective weight to each of the multiplicity of paths; and
      selecting a selected path from the multiplicity of paths in accordance with the weight;
   while a stopping criterion has not been met, the stopping criterion is an elapsed time period:
      determining additional segments fanning out from an end point of the selected path in the first angular resolution, each proceeding at one of a multiplicity of directions;
      in case an additional segment intersects with an obstacle on the map,
      determining further additional segments fanning out from the end point in the second angular resolution;
      adding additional paths to the multiplicity of paths, each including the selected path and one of the additional segments starting at the end point;
      assigning a weight to each of the additional paths that does not intersect with an obstacle; and
      selecting a selected path from the multiplicity of paths according to the weights;
   and
   once the stopping criterion is met generating steering instructions for steering the vehicle in accordance with the selected path;
   wherein the map is generated based on scanning data received from a scanning device mounted on the vehicle; and
   steering the vehicle in accordance with the steering instructions.

2. The method of claim 1, wherein the selected path is selected as a path having a lowest absolute weight.

3. The method of claim 1, wherein the selected path is selected as a path having a lowest weight per segment.

4. The method of claim 1, further comprising:
   determining a second selected path selected from a second multiplicity of paths, using another first angular resolution different from the first angular resolution, and/or another second angular resolution different from the second angular resolution; and
   generating steering instructions for autonomously steering the vehicle along a path selected from the selected path and the second selected path.

5. The method of claim 4, wherein:
   the first angular resolution and the second angular resolution are lower than the other first angular resolution and the other second angular resolution, respectively,
   the selected path is selected from the multiplicity of paths in accordance with a lowest absolute weight, and
   the second selected path is selected from the second multiplicity of paths in accordance with a lowest weight per segment.

6. The method of claim 4 further comprising: using a first core for generating the multiplicity of paths and a second core for generating the second multiplicity of paths.

7. The method of claim 4, wherein the weight assigned to each path of the multiplicity of paths is determined in accordance with smoothness of the path and proximity of an end point of the path to a destination.

8. The method of claim 1, wherein the vehicle is an unmanned ground vehicle (UGV).

9. The method of claim 1, wherein the further additional segments fanning out from the end point in the second angular resolution are added in a limited range around the end point; wherein the limited range starts, at or near the additional segment that intersects with the obstacle and ends at or near another additional segment that does intersects with the obstacle.

10. A system for autonomous path planning for autonomously navigating a vehicle,
the system comprising a computer processing device configured, while traversing an area, to:
   receive data indicative of:
      a map of an area, a starting point in the map and a destination in the map;
   generate a path leading to the destination, comprising:
      generate a plurality of initial segments fanning out around the starting point in a first angular resolution, each of the plurality of initial segments proceeding in one of a multiplicity of directions;
      in case an initial segment intersects with an obstacle on the map, switch from the first angular resolution to a second angular resolution and generate further initial segments fanning out around the starting point, the second angular resolution being higher than the first angular resolution;
      wherein each initial segment represent a respective path, giving rise to a multiplicity of paths;
      assign, a weight to each of the multiplicity of paths;
      select, in accordance with the weights a selected path from the multiplicity of paths;
   while a stopping criterion has not been met, the stopping criterion is an elapsed time period:
      generate additional segments fanning out from an end point of the selected path in the first angular resolution, each of the additional segments proceeding at one of a multiplicity of directions;
      in case an additional segment intersects with an obstacle on the map, switch from the first angular resolution to the second angular resolution and generate further additional segments fanning out from the a second angular resolution, the second angular resolution;

add additional paths to the multiplicity of paths, each including the selected path and one of the additional segments starting at the end point, assign a weight to each of the additional paths that does not intersect with an obstacle; and select, a selected path from the multiplicity of paths according to the weights; and once the stopping criterion is met, generate steering instructions for steering the vehicle in accordance with the selected path;

and wherein the map is generated based on scanning data received from a scanning device mounted on the vehicle; and steering the vehicle in accordance with the steering instructions.

11. The system of claim 10, wherein the computer processing device is configured to generate the plurality of initial segments fanning out around the starting point in a first angular resolution, by starting at one side and continuously proceeding toward an opposite side.

12. The system of claim 10, wherein the computer processing device is configured to generate the additional segments fanning out from the end point in a first angular resolution, by starting at one side and proceeding toward an opposite side.

13. The system of claim 10, wherein the computer processing device is further configured to:

generate a second multiplicity of paths, using another first angular resolution different from the first angular resolution, and/or another second angular resolution different from the second angular resolution, and selecting a second selected path from the second multiplicity of paths; and generate steering instructions for steering the vehicle according to a path selected from the selected path and the second selected path.

14. The system of claim 13, wherein the first angular resolution and the second angular resolution are lower than the other first angular resolution and the other second angular resolution, respectively, wherein the selected path is selected from the multiplicity of paths in accordance with a lowest absolute weight, and wherein the second selected path is selected from the second multiplicity of paths in accordance with a lowest weight per segment.

15. The system of claim 14, wherein the multiplicity of paths and the second multiplicity of paths are generated by different cores.

16. The system of claim 10, further comprising or otherwise operatively connected to the system of claim 14, wherein the map is generated upon scanning data received from a scanning device mounted on the vehicle.

17. The system of claim 10, wherein the vehicle is an unmanned ground vehicle (UGV).

18. The system of claim 10, wherein the computer processing device include a first core and a second core, wherein the first core is configured to execute a first process that includes the generating of the multiplicity of paths and selecting the selected path and the second core is configured to execute a second process that includes generating a second multiplicity of paths and selecting a second selected path; wherein the second selected path is selected from the second multiplicity of paths generated using another first angular resolution different from the first angular resolution, and/or another second angular resolution different from the second angular resolution;

the computer processing device is configured to generate steering instructions for steering the vehicle according to a path selected from the selected path and the second selected path.

19. The system of claim 10, wherein the computer processing device includes a first core and one or more additional cores, wherein the first core is configured to execute a first process that includes generating of the multiplicity of paths and selecting the selected path and each one of the one or more additional cores is configured to execute a respective process for determining a respective selected path, thereby giving rise to one or more additional selected paths; wherein each respective path is selected from a respective multiplicity of paths generated using a respective first angular resolution different from the first angular resolution, and/or a respective second angular resolution different from the second angular resolution;

the computer processing device is configured to generate steering instructions for steering the vehicle according to a path selected from the selected path and the one or more additional selected paths.

20. The system of claim 18, wherein each respective first resolution and respective second resolution is unique.

21. The system of claim 10, wherein the computer processing device is configured to add the further additional segments fanning out from the end point in a limited range around the end point; wherein the limited range starts, at or near the additional segment that intersects with the obstacle and ends at or near another additional segment that does intersects with the obstacle.

22. An unmanned ground vehicle (UGV) comprising a system for autonomous path planning for autonomously navigating a vehicle, the system comprising a computer processing device configured, while traversing an area, to:

receive data indicative of:
a map of an area, a starting point in the map and a destination in the map;

generate a path leading to the destination, comprising:
generate a plurality of initial segments fanning out around the starting point in a first angular resolution, each of the plurality of initial segments proceeding in one of a multiplicity of directions;

in case an initial segment intersects with an obstacle on the map, switch from the first angular resolution to a second angular resolution and generate further initial segments fanning out around the starting point, the second angular resolution being higher than the first angular resolution;

wherein each initial segment represent a respective path, giving rise to a multiplicity of paths;

assign, a weight to each of the first multiplicity of paths;

select, in accordance with the weights a selected path from the multiplicity of paths;

while a stopping criterion has not been met, the stopping criterion is an elapsed time period:

generate additional segments fanning out from an end point of the selected path in the first angular resolution, each of the additional segments proceeding at one of a multiplicity of directions;

in case an additional segment intersects with an obstacle on the map, switch from the first angular resolution to the second angular resolution and generate further additional segments fanning out from the a second angular resolution, the second angular resolution;

add additional paths to the multiplicity of paths, each including the selected path and one of the additional segments starting at the end point, assign a weight to each of the additional paths that does not intersect with an obstacle; and select, a selected path from the multiplicity of paths according to the weights; and once the stopping criterion is met, generate steering instructions for steering the vehicle in accordance with the selected path;

and wherein the map is generated based on scanning data received from a scanning device mounted on the vehicle; and steering the vehicle in accordance with the steering instructions.

23. A non-transitory computer readable storage medium tangibly embodying a program of instructions that, when executed by a computer, causing the computer to perform a method of autonomous path planning for navigating a vehicle, the method comprising while traversing an area using at least one computer processing device for:

receiving data indicative of:
a map of the area, a starting point in the map, and a destination in the map;

generating a path leading to the destination, comprising:
determining a plurality of initial segments fanning out from the starting point in a first angular resolution, each of the plurality of initial segments proceeding at one of a multiplicity of directions;

if an initial segment collides with an obstacle indicated on the map, determining additional initial segments fanning out from the starting point in a second angular resolution that is higher than the first angular resolution;

wherein each initial segment represents a respective path, giving rise to a multiplicity of paths;

assigning, a respective weight to each of the multiplicity of paths; and selecting, a selected path from the multiplicity of paths in accordance with the weight;

while a stopping criterion has not been met, wherein the stopping criterion is an elapsed time period:

determining additional segments fanning out from an end point of the selected path in the first angular resolution, each proceeding at one of a multiplicity of directions;

in case an additional segment intersects with an obstacle on the map, determining further additional segments fanning out from the end point in the second angular resolution;

adding additional paths to the multiplicity of paths, each including the selected path and one of the additional segments starting at the end point;

assigning a weight to each of the additional paths that does not intersects with an obstacle; and selecting a selected path from the multiplicity of paths according to the weights;

and once the stopping criterion is met generating steering instructions for steering the vehicle in accordance with the selected path;

and wherein the map is generated based on scanning data received from a scanning device mounted on the vehicle; and steering the vehicle in accordance with the steering instructions.

\* \* \* \* \*

UNITED STATES PATENT AND TRADEMARK OFFICE
CERTIFICATE OF CORRECTION

PATENT NO. : 11,519,737 B2
APPLICATION NO. : 16/631244
DATED : December 6, 2022
INVENTOR(S) : Dina Appelman, Ofir Cohen and Roman Bronstein Page 1 of 1

It is certified that error appears in the above-identified patent and that said Letters Patent is hereby corrected as shown below:

In the Claims

Column 23, Lines 2-3, Claim 10 delete ", the second angular resolution;".

Signed and Sealed this
Twenty-seventh Day of June, 2023

Katherine Kelly Vidal
*Director of the United States Patent and Trademark Office*